(12) United States Patent
Sivanathan et al.

(10) Patent No.: US 8,306,868 B2
(45) Date of Patent: Nov. 6, 2012

(54) METHOD FOR ACCEPTING PAYMENT INFORMATION ON THE WEB USING AN INTERACTIVE VOICE RESPONSE SYSTEM

(76) Inventors: Bhaskar Arcot Sivanathan, San Diego, CA (US); Navamitran Sivaprakasam, Tustin, CA (US)

( * ) Notice: Subject to any disclaimer, the term of this patent is extended or adjusted under 35 U.S.C. 154(b) by 69 days.

(21) Appl. No.: 12/972,473

(22) Filed: Dec. 19, 2010

(65) Prior Publication Data

US 2011/0119157 A1    May 19, 2011

(51) Int. Cl.
*G06Q 30/00* (2012.01)
(52) U.S. Cl. ..................................................... 705/26.1
(58) Field of Classification Search ................ 705/26.1, 705/27.1; 379/91.01, 90.01
See application file for complete search history.

(56) References Cited

U.S. PATENT DOCUMENTS

| | | | | |
|---|---|---|---|---|
| 6,055,513 A | * | 4/2000 | Katz et al. .................. | 705/26.41 |
| 6,941,273 B1 | * | 9/2005 | Loghmani et al. ......... | 705/26.62 |
| 8,099,077 B2 | * | 1/2012 | Chowdhury et al. ......... | 455/406 |
| 2003/0130904 A1 | * | 7/2003 | Katz et al. ........................ | 705/26 |
| 2005/0256802 A1 | * | 11/2005 | Ammermann et al. ......... | 705/44 |
| 2010/0054429 A1 | * | 3/2010 | Tonini ......................... | 379/88.02 |
| 2010/0191608 A1 | * | 7/2010 | Mikkelsen et al. ............. | 705/26 |

OTHER PUBLICATIONS

V Terziyan, "Mobile e-commerce transaction model" Information Technology Research Institute, Dec. 31, 2000.*

* cited by examiner

*Primary Examiner* — Matthew Zimmerman

(57) ABSTRACT

Alternative method of paying with a credit card rather than entering it through a web page, but using an Interactive voice response (IVR) system. Customer selects from the web page "Checkout with PaybyPhone" from the payment portion of the checkout page. A system and method for paying by a credit card, preferably at a point of sale, is disclosed. The system employs an automated IVR system which the user calls using any telephone/cell phone, and enters their credit card information by using the key pad of the telephone/cell phone in response to verbal questions posed by the system. In one embodiment, only numeric information concerning the payment is entered. This credit card payment information will be used to approve/decline the order via third party gateway. The system provides the user with verbal and visual information regarding the result of the payment/order.

1 Claim, 17 Drawing Sheets

FIG. 11

Call IVR

| Please call: | 1-800-xxx-xxxx |
| Passcode: | 672347 |

FIG. 12

Call Update

| Status Update | ~~~~~~~~~~~~~~~~~ |
| Entered Passcode | Done |
| Entered Credit Card Info | ☺ Done |
| Confirm Purchase Info | |
| Verifying Credit Card Info | ~~~~~~ |
| Purchase | Approved/Declined |

FIG. 13

Summary Info

| Confirmation Number | |
| --- | --- |
| Items Purchased | |
| Item 1 | |
| Item 2 | |
| Total | |

Note: Email has been sent to your account with the Summary Information

FIG. 14

Call Update

Note: Call has ended due to unknown reason; your verification is still in progress.
DO NOT CLOSE THIS WINDOW After Verification,
Go to page 4 – if passed
Go to Page 6 – if failed

FIG. 15

Our Payment option for eCommerce and Online Shopping websites
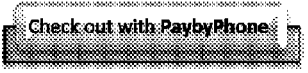
Note: Image design not finalized
FIG. 18
Common payment options available in current eCommerce and online shopping websites.
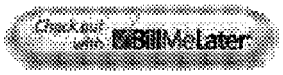
Pay by Credit Card directly from vendor's website
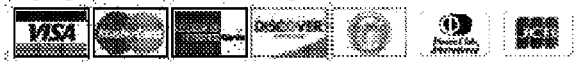
FIG. 19

| Num | Title | English Text | Status |
|---|---|---|---|
| 1 | HolidayWelcome | Welcome to Thought Frameworks or <Customer Name> | |
| 2 | RegularWelcome | Happy holidays and welcome to Thought Frameworks or <Customer Name> | |
| 3 | Broadcast | For security reasons we will not save your payment information in our system. Next time when you make a purchase you will have to re-enter all your information again. | |
| 4 | EnterPasscode_Tier1 | Enter the pass code. | |
| 5 | EnterPasscode_Tier2 | We will need the pass code to retrieve your purchase information. Enter your pass code. | |
| 6 | EnterPasscode_Tier3 | Without the Pass code we will not be able to retrieve your purchase information. Enter your pass code. | |
| 7 | TroubleUnderstandingYourResponse | I don't understand your input | |
| 8 | CallBack | Please call back later. Thank you and goodbye | |
| 9 | SystemTroubleCallBack | Systems are temporarily down. Please call back later. Thank you and goodbye. | |
| 10 | PassCodeDidNotMatch | The Pass code that you entered did not match the one that was provided in the website. | |
| 11 | PassCodeDidNotMatchTryAgain | In order for us to take accept your payment information we will need the pass code. Please enter your pass code.14 | |
| 12 | MustEnterPassCodeGoodBye | Since you did not enter the pass code that was provided to you in the website, we will not be able to accept your payment information. Please call use back with the pass code. Thank you for using our payment system, Goodbye. | |
| 13 | LetsBegin | Let's start... | |
| 14 | Great | Great! | |
| 15 | TF_New_CardNumber_Tier1 | Please enter your credit card number | |
| 16 | TF_New_CardNumber_Tier2 | In order for us to process your payment we will need your card number. Please enter your credit card number. | |
| 17 | TF_New_CardNumber_Tier3 | Please enter your credit card number | |
| 18 | MasterCardPress1 | If it is a master card, press 1 | |
| 19 | VisaPress2 | If it is a Visa press 2 | |
| 20 | AmexPress3 | Is it is American Express press 3 | |
| 21 | MustEnterCardType | In order for us to process your payment we will need your card type. Thank you and Goodbye. | |
| 22 | MustEnterExpDate | In order for us to process your payment we will need your card expiry date. Thank you and Goodbye. | |
| 23 | MustEnterAddress | In order for us to process your payment we will need your address. Thank you and Goodbye. | |
| 24 | MustEnterZIP | In order for us to process your payment we will need your zip code. Thank you and Goodbye. | |
| 25 | VerificationFailed | The account information that you entered has failed. Thank you and Goodbye. | |
| 26 | YourPurchaseSummaryIs | The summary of your purchase information is... | |
| 27 | RepeatInfo | To repeat this information press 1 or say yes or no | |
| 28 | ThankYouGoodbye | Thank you for using our automated system. Goodbye. | |

FIG. 20

METHOD FOR ACCEPTING PAYMENT INFORMATION ON THE WEB USING AN INTERACTIVE VOICE RESPONSE SYSTEM

FIELD OF THE INVENTION

The invention relates to credit card products and to systems and methods where customers use the website to purchase products/services. The invention relates to systems and methods for quickly enabling the users an alternate way of paying through a credit card using an Interactive voice response (IVR) system redirected from the web page (Checkout with PaybyPhone) from payment portion of the checkout page, rather than the conventional way of entering through the web page.

BACKGROUND OF THE INVENTION

Today if a customer needs to purchase an item from the website, they need to enter their credit card information on the web. Once the customer enters the card number, expiry date . . . etc their information is sent to a credit bureau (as EQUIFAX, TRANSUNION, or EXPERIAN, or other credit clearing houses) or a third party system that approves/disapproves the order.

We believe that there are a considerable number of individuals who are very tentative or skeptical about providing sensitive information over the web. Our software will provide them an alternate way to dial our number and instantly give their personal information, which will be linked to their purchase.

The way our system will work is when the user selects the option to pay via IVR, they get a window in the website which consists of a number to call and a PASSCODE to enter. The PASSCODE is tied to their shopping cart. Once the user calls the IVR, they are, prompted to enter their PASSCODE.

Once they enter their PASSCODE, the system instantaneously retrieves their name, address, shopping card details and the total amount due. Once they confirm the purchase order, they will be prompted to enter their credit card information. Since the users are accustomed to using the phone, they feel comfortable and our encrypted system provides all the security that they wanted to collect and transmit their credit card information.

Once the credit card information is collected, the data will be electronically (Encrypted) passed to the credit bureau or any third party system to approve/disapprove their order.

After the verification process the user will be notified if they were approved or have been disapproved. They will also get a confirmation as to what they have purchased and paid for.

A notification email will also be sent to them with the confirmation details.

1. Client web page will display IVR as a Payment option.
2. Users will be able to select IVR as an payment option and get redirected to phone payment gateway webpage. (PPGW)
3. Phone payment gateway webpage should display
    a. The IVR number to call.
    b. PASSCODE for the user to enter once they call the IVR.
    c. PASSCODE receive message
    d. Confirm Shopping Cart Item list & Payment details
    e. Confirm Personal information
    f. Confirm Credit card information
    g. Optional—When call is dropped just before verification step
        i. Your information except Credit card is stored, retry by calling the <800 number> with <PASSCODE>
        ii. This step is common to any data collection prior to verification.
    h. Optional—When call is dropped after verification
        i. Your call was disconnected during verification; we shall send you a confirmation email on the status.
    i. Verification Status bar
    j. Confirm Payment completed/Verification Status failed
        i. If Verification Status failed, two option are displayed
            1. Use other payment options in the <Client's> website for purchasing your product.
        ii. If Verification Status passed, do nothing.
    k. Purchase Completed Status and redirecting to Client web site.
4. Each client will have a separate IVR number to call (ANI).
5. PASSCODE will be a system generated phrase (must be secure), which will be unique and will be tied to the client.
6. PASSCODE
    a. will be 9 digit numbers.
    b. will expire in 3 minutes or depending on Client configuration.
    c. Count down time is started, on elapse, redirect the web page to clients shopping cart.
    d. will be recycled.
    e. If user leaves the page and returns, new PASSCODE will be generated.
7. Once the user enters the PASSCODE in the IVR, the system will update point 3a on PPGW with a Tick mark.
8. On each stage of collecting customer information, appropriate message in step 3 is updated with a Tick mark.
9. Any failure that happens during the call either at customer end or at our end
    a. When a major failure such as a system failure occurs (at Thought Frameworks end), then after specified time, PPGW will redirect to Client's website.
    b. When a minor failure occurs such as a
        i. API failure—API retries the service call twice, if it fails, then update step 3j—"use other payment options in the <Client's> website for purchasing your product."
        ii. Phone call dropped just before verification step
            1. Your information except Credit card is stored, retry by calling the <800 number> with <PASSCODE> is displayed in step 3g
    c. When the user returns, new PASSCODE will be generated.
10. Once the payment has been processed in the IVR, the system will update point 3j & 3k with Tick mark.
11. IVR will play the Summary Information (Confirmation number, Amount, etc) IVR disconnects We strongly believe that there are many potential customers who do not complete their transaction just because they are not comfortable giving their information over the web.

SUMMARY OF THE INVENTION

Alternative method of paying through a credit card using an interactive voice response system rather than the conventional way of entering in the web portal. A system and method for paying by a credit card, preferably at a point of sale, is disclosed. The system employs an automated interactive voice response system preferably sponsored by client (Website owner). The user calls into the system using a standard telephone, and enters credit payment information about the customer using the key pad of the telephone in response to verbal questions posed by the system. In one embodiment, only numeric information concerning the customer is entered, such as the customer's credit card number, expiry date . . . etc. This credit card payment information is used to approve/decline via credit bureau database or a third party vendor who specializes in credit card payment processing, which is used by the system to electronically decide whether to proceed with the order or not. The system verbally provides information to the user regarding the results of credit card validation, so that the customer's credit purchase can be quickly completed. The system requires slight modification to existing point of sales system (Website) where there will be an option for the customers to select IVR as the payment.

DETAILED DESCRIPTION OF THE INVENTION

Figure 21:
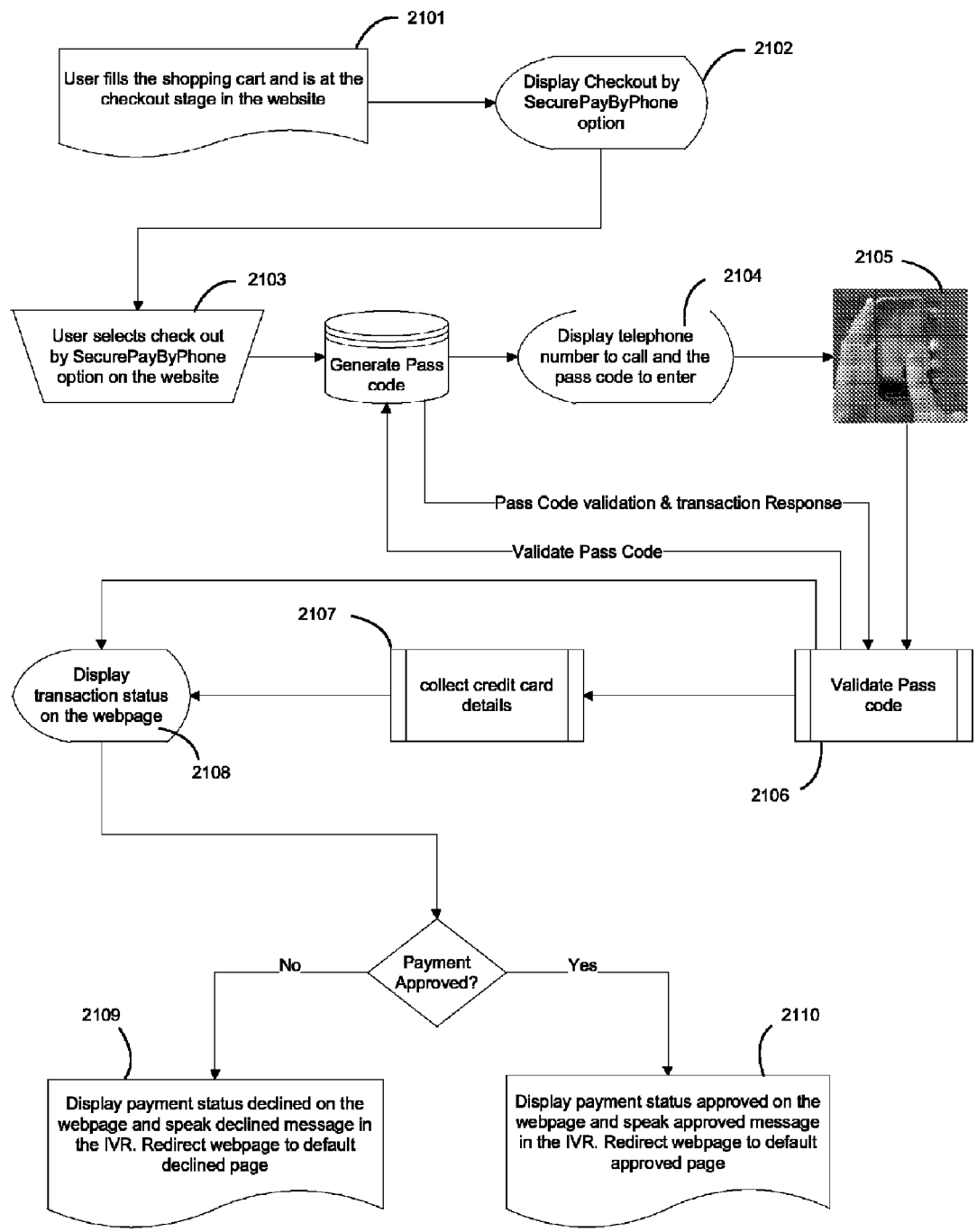

Interactive voice response (IVR) (Checkout with PaybyPhone) as payment option:

1. FIG. 11—is a wireframe showing "Check out with PayByPhone" as a payment option. Customer selects the items they planned to purchase and adds them into the shopping cart. When they are ready to buy, they fill out their name and address at checkout as shown in Step 2101, in FIG. 21. Now they will be presented with multiple common payment options like Check out with BillMeLater, Check out with PayPal, Google Checkout, Checkout with eBillme, Checkout with Amazon and Pay by Credit Card directly from Vendor's website like Visa, MasterCard, American Express Cards, Discover, Dinners Club international, JCB, etc.

2. Once they choose to pay by credit card they will be presented with an option to enter their credit card information through web or IVR (Checkout with PaybyPhone) (The one that we are claiming) as shown in Step 2102, in FIG. 21

3. FIG. 11—is a wireframe showing "Check out with PayByPhone" as a payment option. When the user chooses IVR as the payment option on the web user clicks on checkout with PaybyPhone as shown in Step 2103, in FIG. 21

4. FIG. 12—is a wireframe showing the toll free number to call and the passcode to enter during the call. A new window will be displayed with the phone number to call and a PASSCODE that they can enter which is tied to their shopping cart 5. FIG. 13—is a wireframe showing the progress which the user made over the phone. Once the user enters a valid PASSCODE on the IVR, the window with the phone number and PASSCODE will be closed and a new window will appear with a list of actions that the user has to perform/enter in the IVR. Once the user enters or goes through the steps in the IVR the items in the window will be marked with a check mark. This will give the user an interactive experience through the IVR and the web at the same time as shown in Step 2108, in FIG. 21.

6. As soon as the caller dials the phone number, they will be prompted by the IVR to enter their PASSCODE as in FIG. 2

7. The PASSCODE will be all digits. The caller will be re-prompted to enter the PASSCODE if it does not match the minimum number of digits or if it is not all digits as in FIG. 2.

8. If the user maxed out the limit for entering the PASSCODE (3), they will be prompted with a goodbye message and the system disconnects as in FIG. 2.

9. Once a valid PASSCODE is entered the system will call the validation service to validate the PASSCODE as in FIG. 2. In Step 2106, in FIG. 21, If the PASSCODE is valid, it will retrieve the shopping cart details and stores it so that the user can confirm the order towards the end of the process. The system also retrieves the caller name and address information that they entered on the website and stores it to verify the credit card information towards the end.

Figure 1:
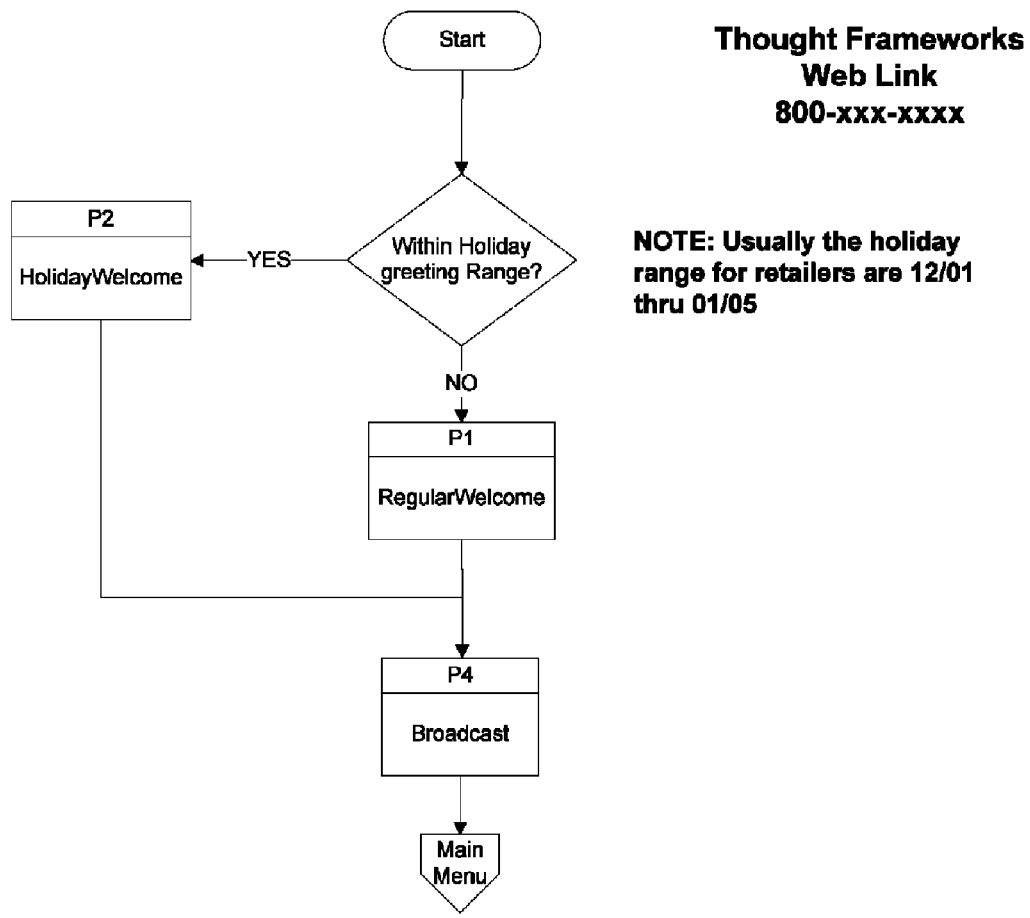
FIG. 1 is a flowchart showing the first message the user will hear when they call the toll free number FIG. 2—is a flowchart showing the passcode collection from the user FIG. 3—is a flowchart showing the selection of the type of credit card by the user FIG. 4—is a flowchart showing the collection of credit card number entered by the user FIG. 5—is a flowchart showing the collection of credit card expiry date entered by the user FIG. 6—is a flowchart showing collection of credit card security code entered by the user FIG. 7—is a flowchart showing the confirmation made by the user with respect to their shopping cart total amount, name, address and credit card details FIG. 8—is a flowchart showing the system verifying the credit card details through a third party system FIG. 9—is a flowchart showing the summary information played to the user upon a successful transaction FIG. 10—is a flowchart showing how a call gets disconnected FIG. 11—is a wireframe showing "Check out with PayByPhone" as a payment option FIG. 12—is a wireframe showing the toll free number to call and the passcode to enter during the call FIG. 13—is a wireframe showing the progress which the user made over the phone FIG. 14—is a wireframe showing the summary information after a successful transaction FIG. 15—is a wireframe showing that the user has ended the call while payment verification was in progress FIG. 16—is a wireframe showing the options available to the user after an unsuccessful transaction FIG. 17—is a wireframe showing that the user has ended the call before the verification stage FIG. 18—is a wireframe showing the "Check out with PayByPhone" option that will be displayed on the checkout portion of ecommerce websites FIG. 19—is a wireframe showing other possible check out options which might be displayed on the checkout portion of ecommerce websites FIG. 20—is a table showing all the voice prompts that will be played over the phone FIG. 21—is a flowchart showing the summary of overall system
Figure 2:
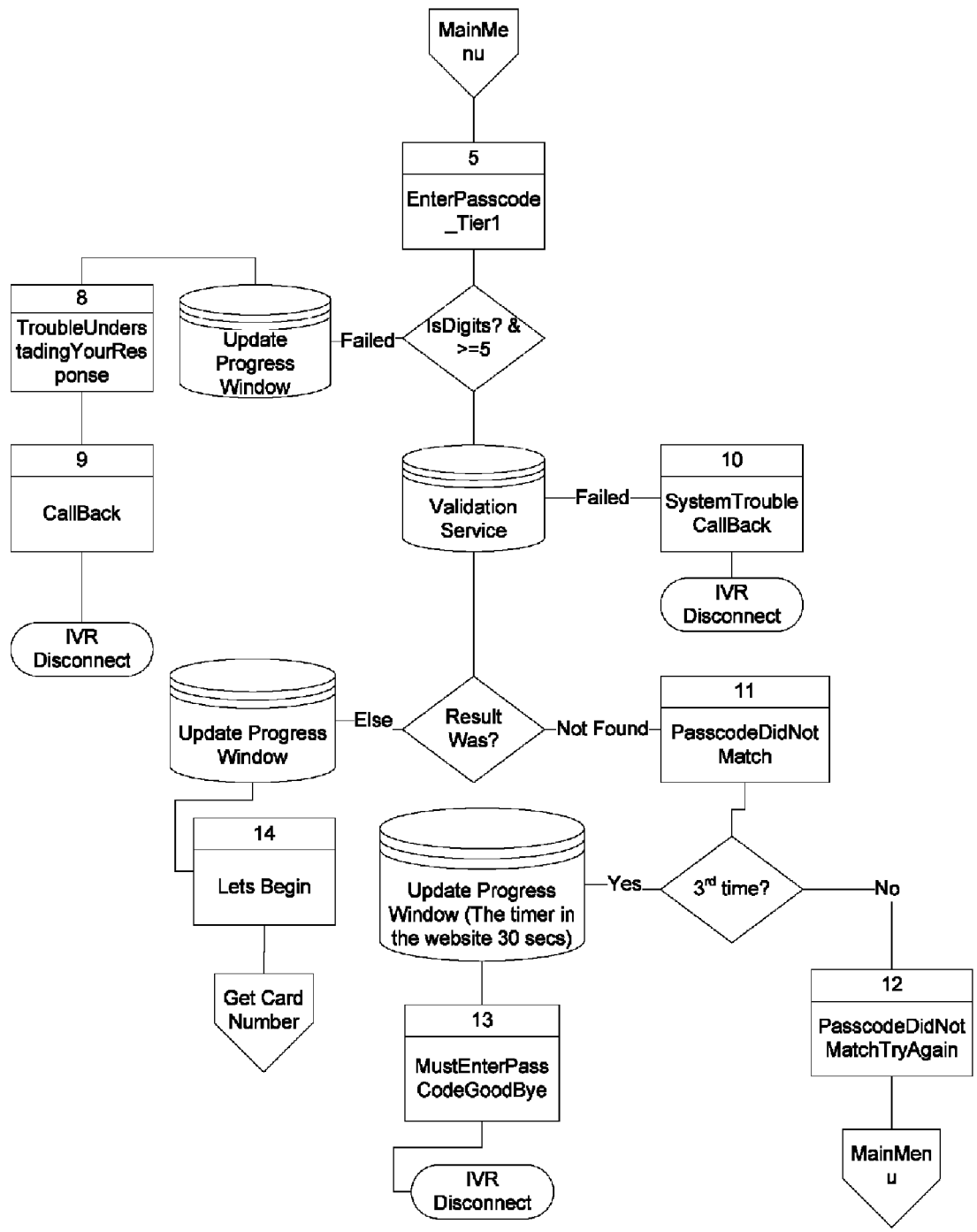

10. The system will send a response to the progress window on the website to indicate that the user has successfully entered the PASSCODE as shown in FIG. 2 & in Step 2108, in FIG. 21.

Figure 3:
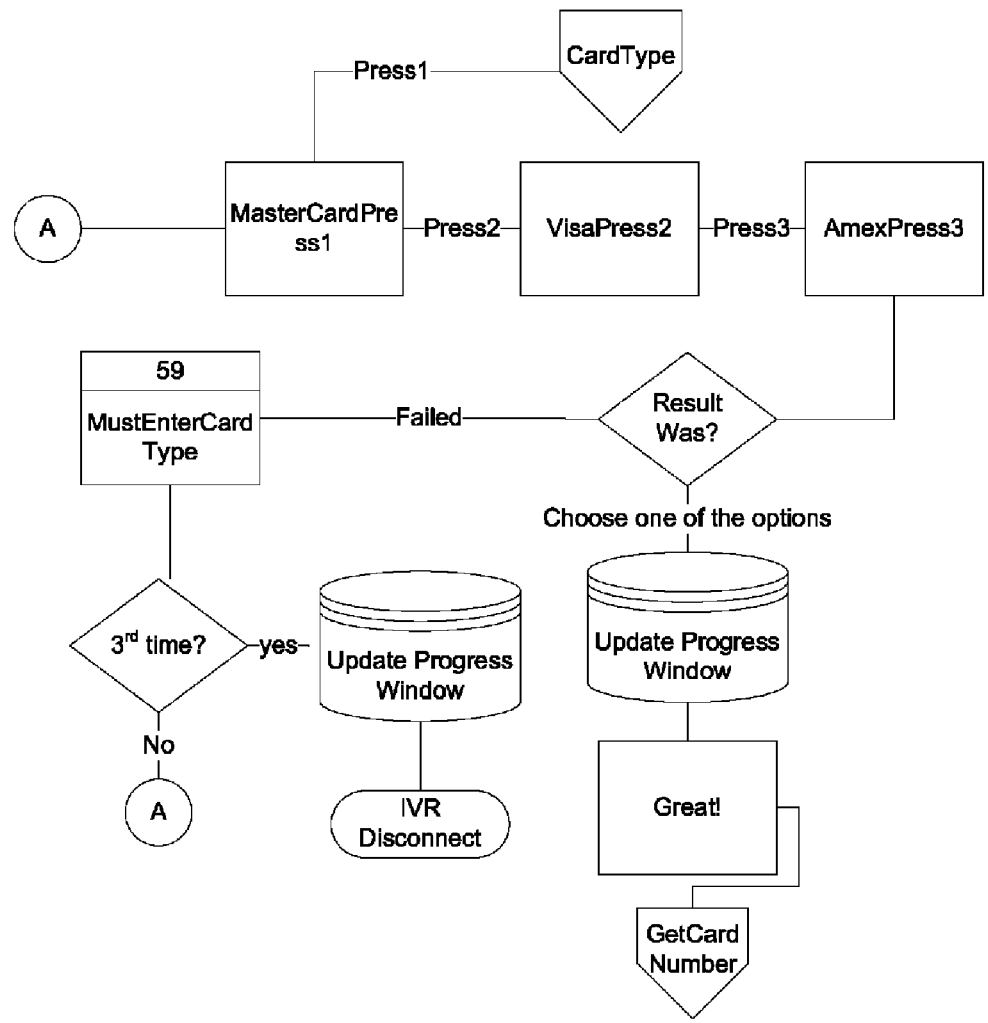

11. FIG. 3—is a flowchart showing the selection of the type of credit card by the user. Now the user will be prompted to choose from a list of card types (Master card, press 1, Visa, press 2 . . . etc).

12. The entry for choosing card type will be all digits. The caller will be re-prompted to enter the option for card type if it does not match the minimum number of digits or if it is not all digits as shown in FIG. 3.

13. If the user maxed out the number of tries to enter the option for card type (3) they will be prompted with a goodbye message and the system disconnects as shown in FIG. 3.

14. The system will send a response to the progress window on the website to indicate that the user has successfully entered the card type as shown in FIG. 3.

Figure 4:
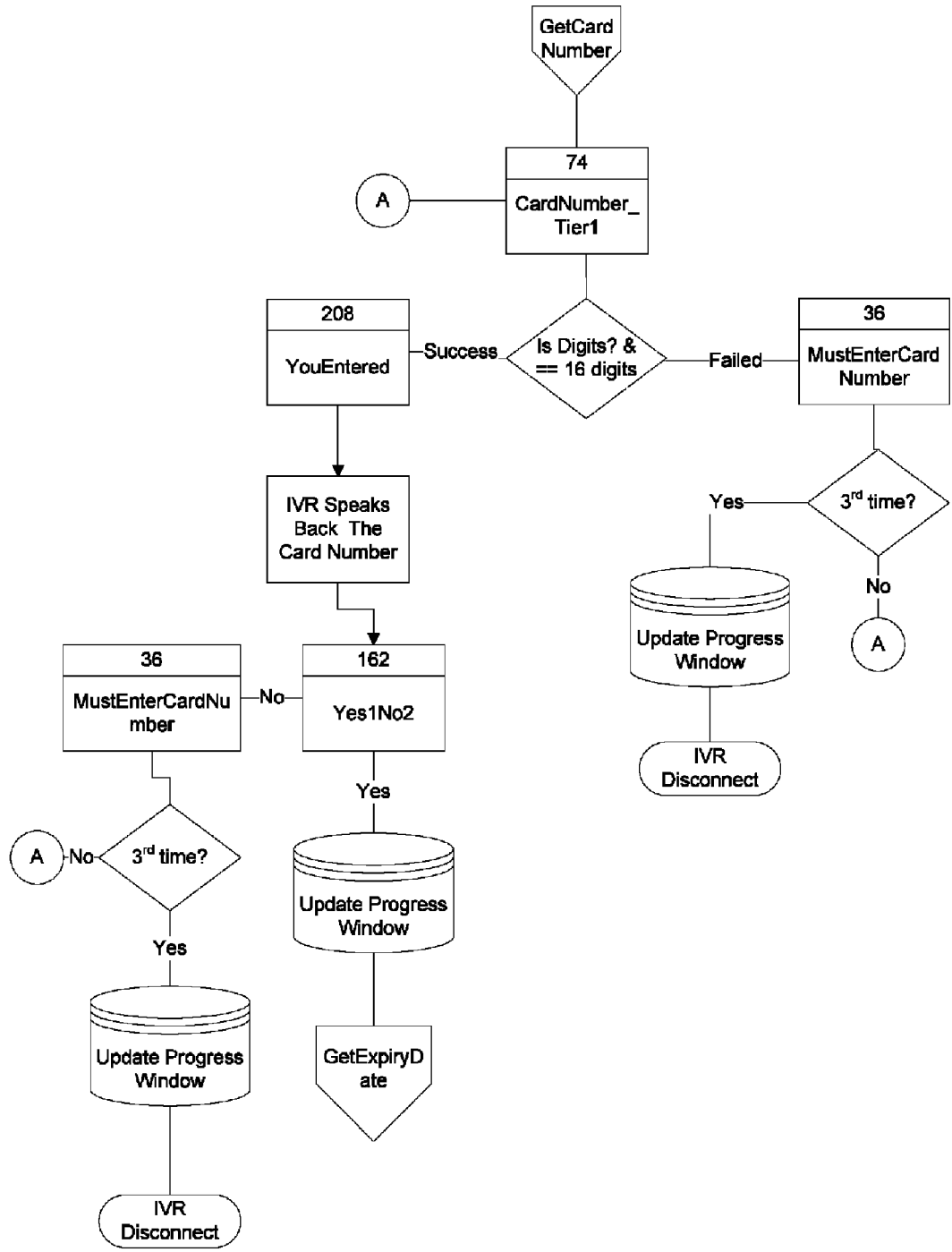

15. FIG. 4—is a flowchart showing the collection of credit card number entered by the user. Now the user will be prompted to enter their credit card number as shown in Step 2107, in FIG. 21

16. The credit card number will be all digits. The caller will be re-prompted to enter the card number if it does not match the minimum number of digits or if it is not all digits as shown in FIG. 4.

17. The system also does the MOD10 check for the card number that the user entered as in FIG. 4.

18. If the user does not enter a valid credit card number and maxed out the total tries (3) the system will send a response to the progress window on the website as shown in Step 2108, in FIG. 21 to indicate that the user was unsuccessful in entering the card number, they will be prompted with a goodbye message and the system disconnects as shown in FIG. 4.

19. Now the system confirms the card number that the user entered by reading it back. It will prompt the user to select 1-Yes or 2-No as in FIG. 4.

20. If the user enters 2-No, then the system gives another attempt to input the card number (Max 3). If the user selects 2-No on the $3^{rd}$ attempt the system will send a response to the progress window on the website as shown in Step 2108, in FIG. 21 to indicate that the user was unsuccessful in entering the card number. The user will be prompted with a goodbye message and the system disconnects as shown in FIG. 4.

21. If the user entered 1-Yes, the system will send a response to the progress window on the website to indicate that the user has successfully entered the Card number as shown in FIG. 4.

Figure 5:
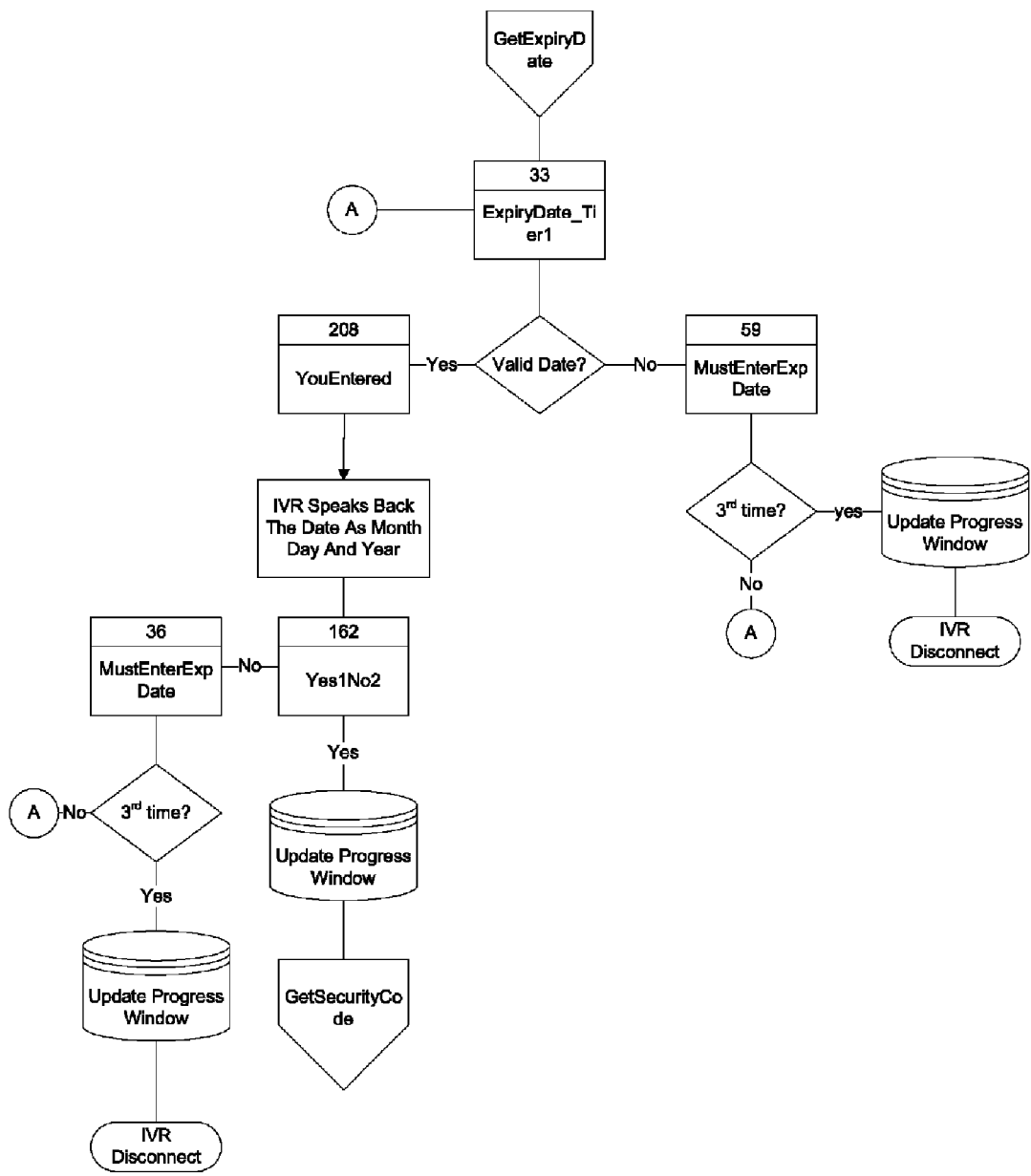

22. FIG. 5—is a flowchart showing the collection of credit card expiry date entered by the user. Now the system prompts the user for the expiry date. The minimum number of digits will be 3 and the maximum number of digits will be 8 (example: 115, 9212 09015, 9052055 . . . etc). The system will make sure that the date is a future date.

23. The date will be all digits. The caller will be re-prompted to enter the date if it does not match the minimum number of digits or if it is not all digits as shown in FIG. 5.

24. If the user maxed out the number of tries to enter the date (3) the system will send a response to the progress window on the website as shown in Step 2108, in FIG. 21 to indicate that the user was unsuccessful in entering the expiry date, they will be prompted with a goodbye message and the system disconnects as shown in FIG. 5.

25. Now the system confirms the expiry date that the user entered by reading it back as month, day and year. It will prompt the user to select 1-Yes or 2-No as shown in FIG. 5.

26. If the user enters 2-No, then the system gives another attempt to input the expiry date (Max 3). If the user selects 2-No on the $3^{rd}$ attempt the system will send a response to the progress window on the website as shown in Step 2108, in FIG. 21 to indicate that the user was unsuccessful in entering the expiry date. The user will be prompted with a goodbye message and the system disconnects as shown in FIG. 5.

27. If the user enters 1-Yes, the system will send a response to the progress window on the website to indicate that the user has successfully entered the expiry date as shown in FIG. 5.

Figure 6:
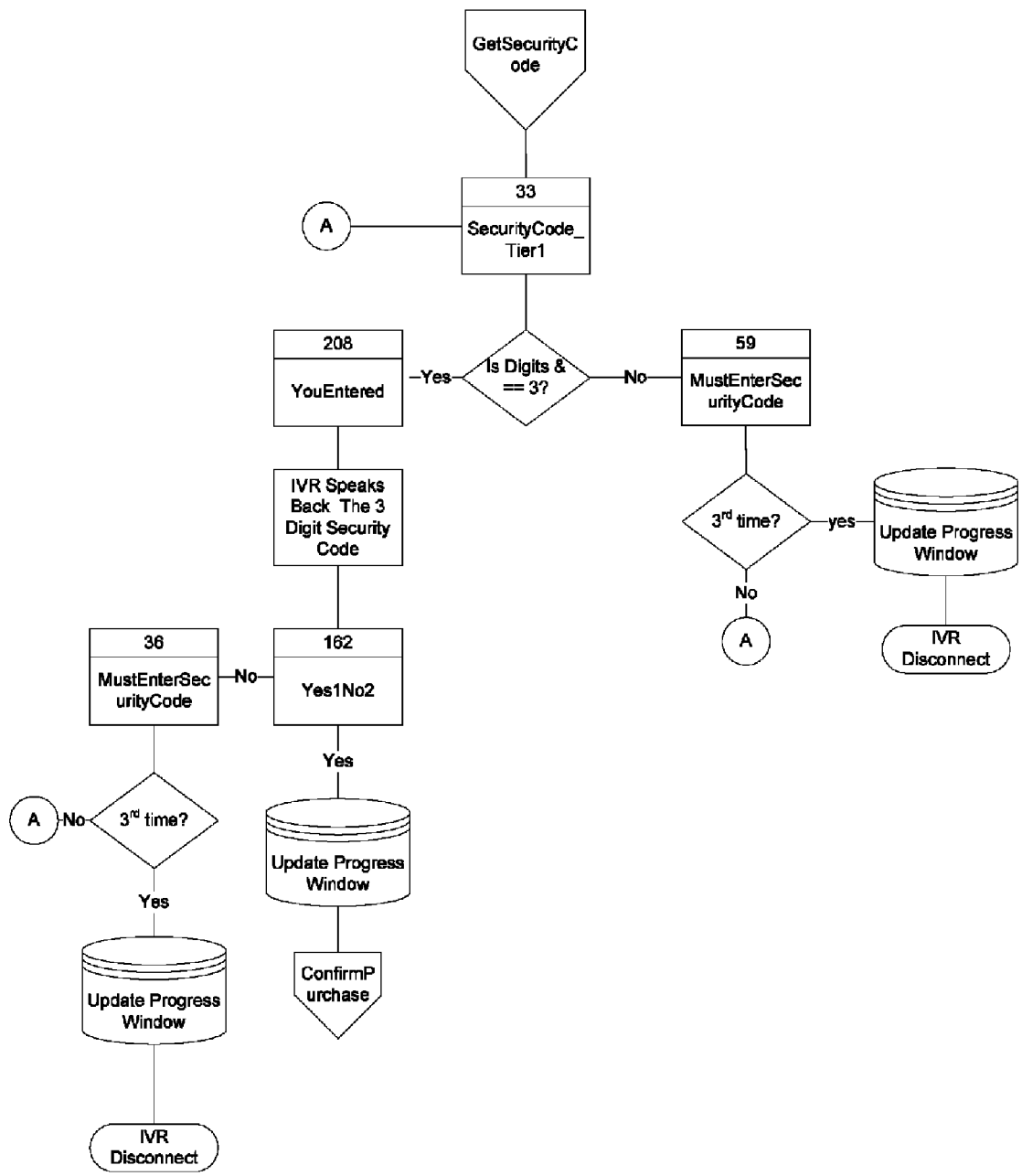

28. The caller will be prompted to enter the three digit security code in the back of the card as shown in FIG. 6.

29. The entry for the three digit security code will be all digits. The caller will be re-prompted to enter the three digit security code if it does not match the minimum number of digits or if it is not all digits as shown in FIG. 6.

30. If the user maxed out the number of tries to enter the three digit security code (3) the system will send a response to the progress window on the website as shown in Step 2108, in FIG. 21 to indicate that the user was unsuccessful in entering the 3 digit security code, they will be prompted with a goodbye message and the system disconnects as shown in FIG. 6.

31. Now the system confirms the 3 digit security code that the user entered by reading it back. It will prompt the user to select 1-Yes or 2-No as shown in FIG. 6.

32. If the user enters 2-No, then the system gives another attempt to input the security code (Max 3). If the user selects 2-No on the $3^{rd}$ attempt the system will send a response to the progress window on the website as shown in Step 2108, in FIG. 21 to indicate that the user was unsuccessful in entering the 3 digit security code. The user will be prompted with a goodbye message and the system disconnects as in FIG. 6.

33. If the user entered 1-Yes, the system will send a response to the progress window on the website to indicate that the user has successfully entered the three digit security code as in FIG. 6.

Figure 7:
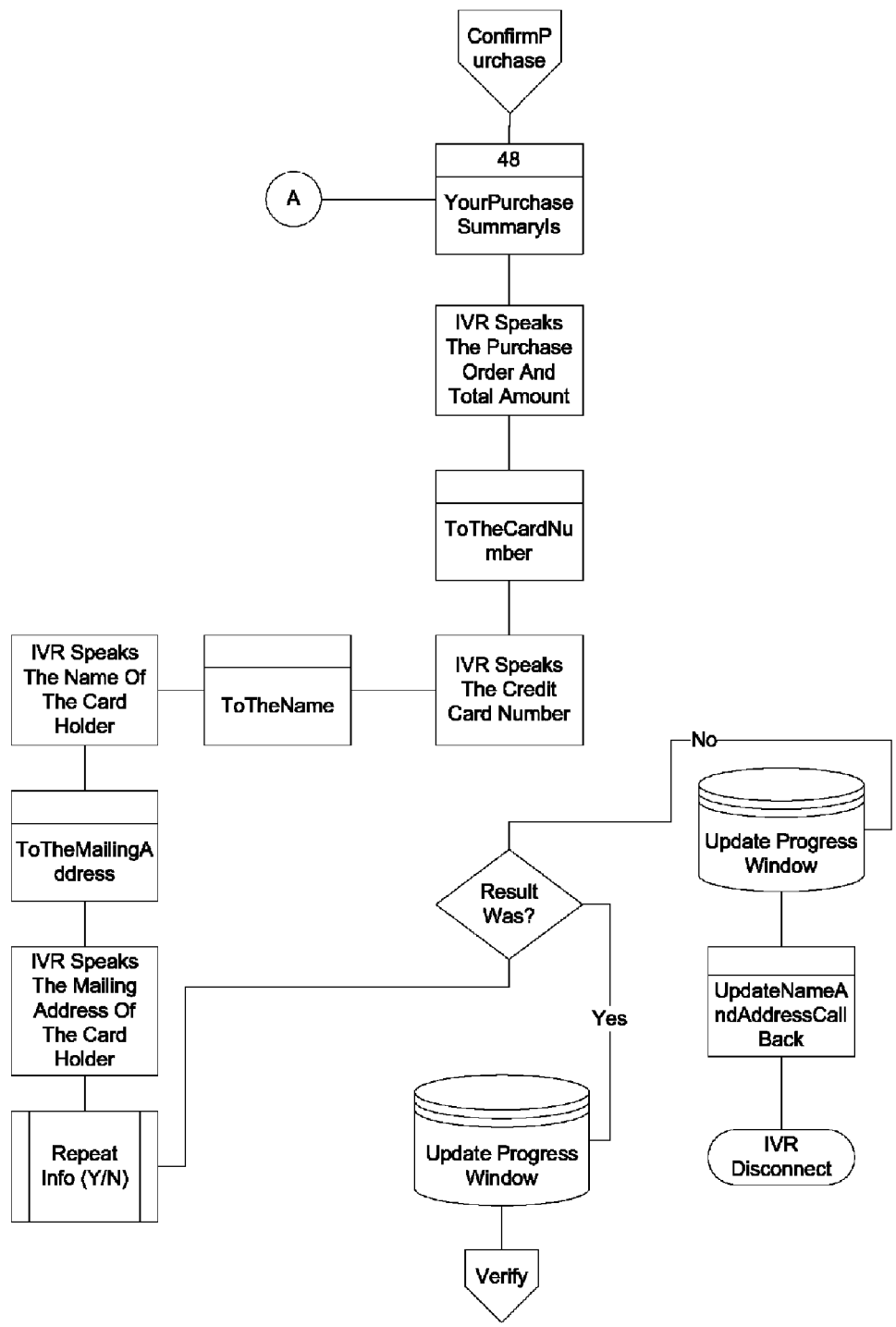

34. FIG. 7—is a flowchart showing the confirmation made by the user with respect to their shopping cart total amount, name, address and credit card details. The caller will be played a summary of the shopping card details with the total amount to be charged, the credit card number, name and the billing address. They will be prompted to choose Yes, press 1 or No, press 2 for confirmation.

35. The entry for the confirmation will be all digits. The caller will be re-prompted to enter their confirmation if it does not match the minimum number of digits or if it is not all digits as shown in FIG. 7.

36. If the user maxed out the number of confirmation attempts (3) they will be prompted with a goodbye message and the system disconnects as shown in FIG. 7.
  a) If the user presses 2-No, the system will prompt user with the message to update the name and/or address on the website, select IVR as an option and call back, Thank you and good bye. The system will update the progress window and redirect them to the payment details webpage.
  b) If the user presses 1-Yes, the system will send a response to the progress window on the website to indicate that the user has confirmed the purchase and the system is currently verifying the credit card information.

Figure 8:
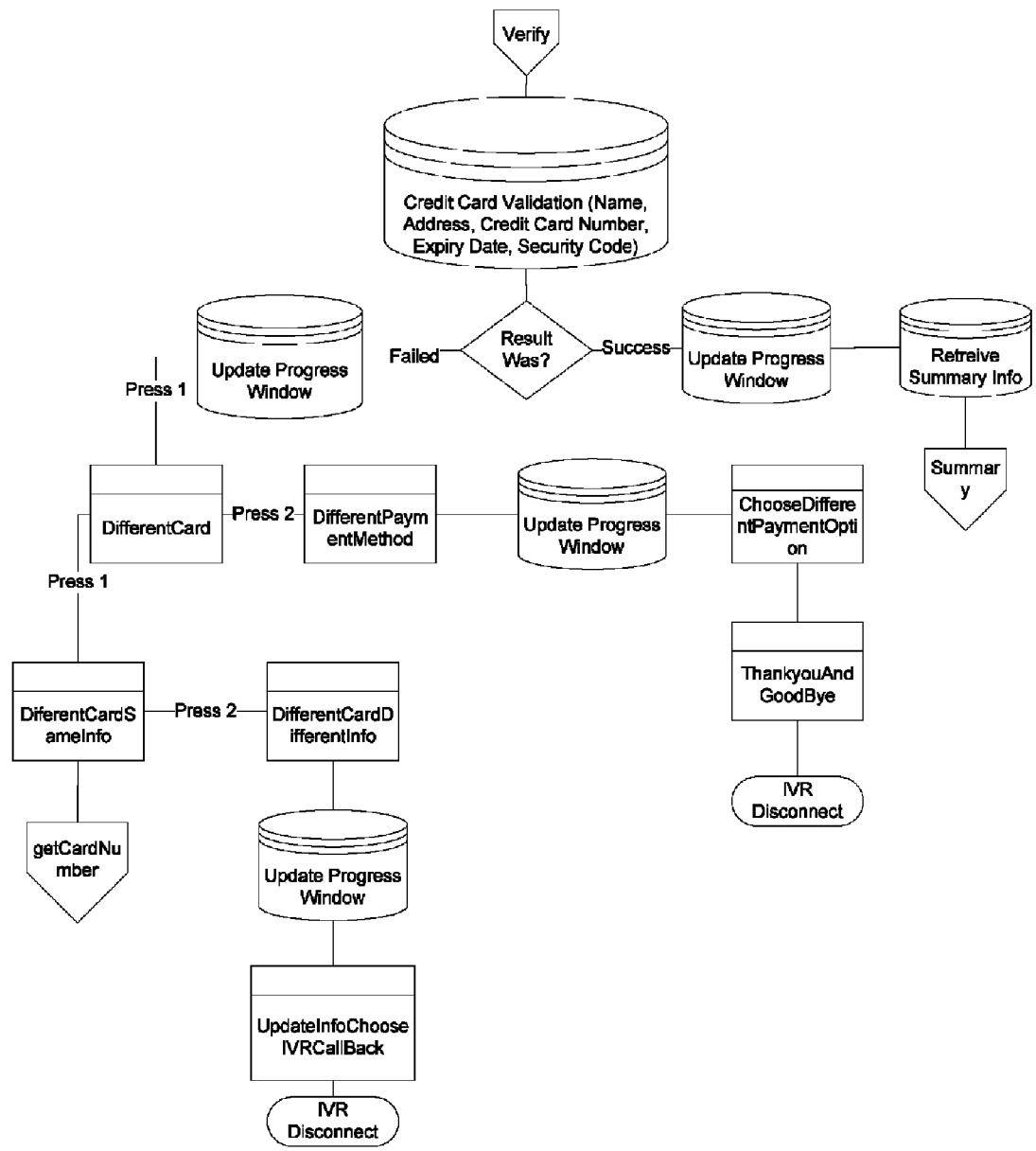

37. FIG. 8—is a flowchart showing the system verifying the credit card details through a third party system. Now the system sends callers name, address, credit card number, expiry date, three digit security code, total amount to be charged to the credit card and card type to a credit bureau or a third party system to get approval for the purchase.

38. Once the system gets the result from the verification service, the user will be prompted in two different ways depending on the results as shown in FIG. 8
  a) If the result was a SUCCESS, meaning the purchase was approved, they will be played a prompt indicating that their purchase was successful. The users will then hear a confirmation number and summary details.
    The system will send a response to the progress window on the website as shown in Step 2110, in FIG. 21 to indicate that the user has been approved for the purchase and the window will display the confirmation number and the summary details as shown in FIG. 14.
  b) If the result was a FAILURE, meaning they were declined for the purchase, then they will be prompted that the purchase was unsuccessful. The user will be presented with two option(s)
    i. To use a different credit card, press 1
    ii. To use a different payment method, press 2 i. If the user selects (In the IVR) to use a 1-different credit card, the user will be prompted with two more option(s)
   1) To use a different credit card with the same name and billing address, press 1
   2) To use a different credit card with a different name and/or billing address, press 2
      The entry for the option will be all digits. The caller will be re-prompted to enter their option if it does not match the minimum number of digits or if it is not all digits.
      If the user maxed out the number of option attempts (3) they will be prompted with a goodbye message and the system disconnects
   1) If the user selects (On the IVR) to choose a 1-different credit card with the same name and billing address then the IVR will prompt them with a message asking them to enter the new credit card number, expiry date, security code . . . etc and follow the same procedure as the 1$^{st}$ attempt.
   2) If the user selects (On the IVR) to choose a 2-different credit card with different name and/or billing address then the system prompts the user to go to the section in the website where they can enter their name and address (The web page would have automatically re-directed to the appropriate section at this point of time). Once completed they can choose to pay through IVR again and they will be presented with the number and PASSCODE.
ii. If the user selects (On the IVR) a 2-different payment method, then the system prompts the user to go to the payment method section on the website to choose their desired payment method (The web page would have automatically re-directed to the appropriate section at this point of time). The users will not have the option to pay by IVR from this point on. The System disconnects.

Figure 16:
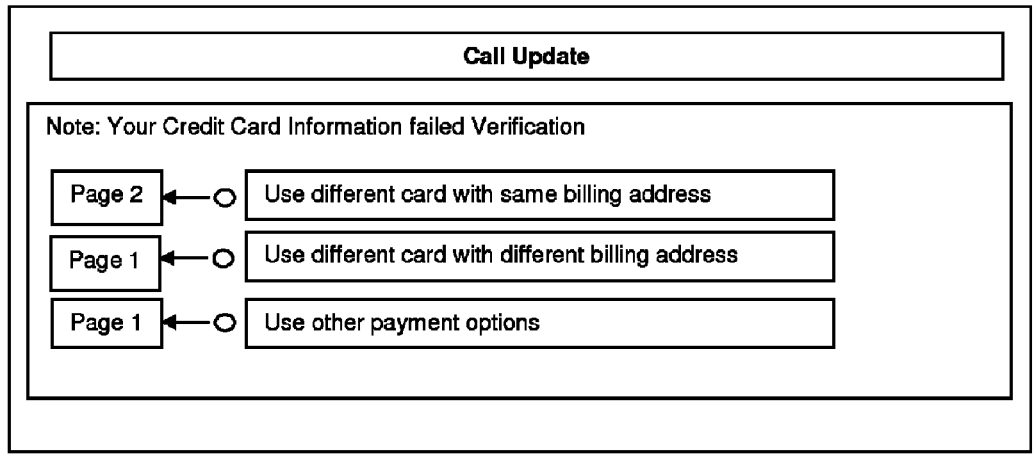
Figure 17:
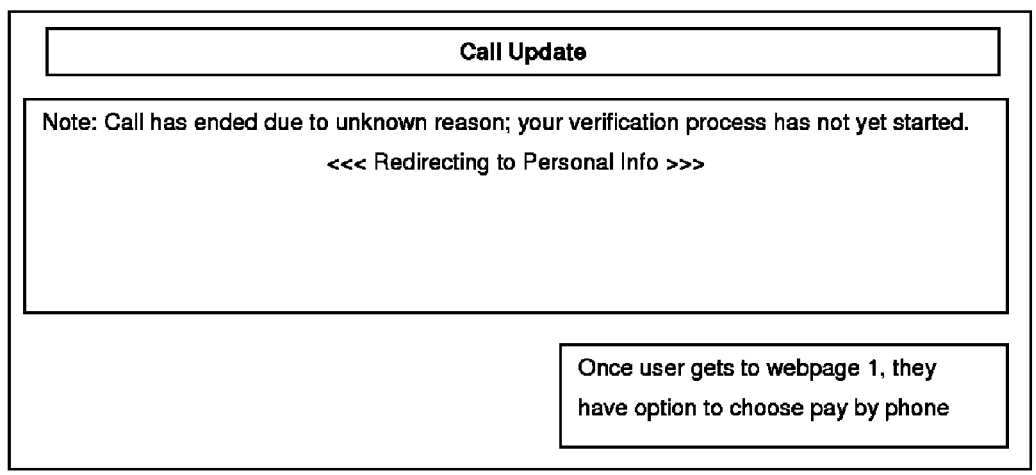

39. The system will send a response to the progress window on the website to indicate that the user has been declined for the purchase as shown in FIG. 8 & as in Step 2109, in FIG. 21. They will be presented with the option(s) as shown in FIG. 16:
   a) To use a different credit card with the same billing address and name
   b) To use a different credit card with different billing address and/or name
   c) To use a different payment method altogether 40. If the user selects (On the web) to choose a different credit card with the same billing address and name then the user will be presented with a new window with the phone number to call and a new PASSCODE to enter as shown in FIG. 8

41. If the user selects (On the web) to choose a different credit card with different billing address and/or name then the user will be taken to the section in the website where they can enter their name and address as shown in FIG. 11. Once completed they can choose to pay through IVR again and they will be presented with the number and PASSCODE.

42. If the user chooses a different payment method, they will be taken to the payment method section on the website to choose their desired payment method. The users will not have the option to pay by IVR from this point on.

Figure 9:
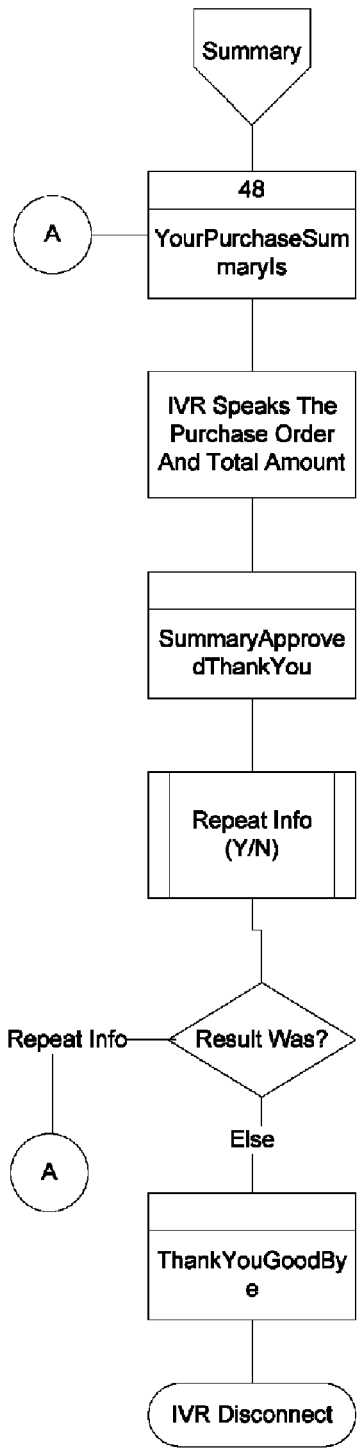
Figure 10:

43. FIG. 9—is a flowchart showing the summary information played to the user upon a successful transaction. The summary message comprises of the order summary. Once the order summary has finished playing the user will be notified that they will also be getting a confirmation email with the confirmation number and summary details. Then the system disconnects as shown in FIG. 10.

What is claimed is:

1. A method of paying for a shopping cart created at a merchant web site using an automated interactive voice response system, the method comprising:
   storing a plurality of items in the shopping cart associated with a user at the merchant web site;
   receiving at the merchant web site a request from the user to pay for the plurality of items in the shopping cart using a telephone;
   in response to receiving the request, generating a passcode associated with the shopping cart and creating a first web-page which includes a toll-free number for the user to call using the telephone and further includes the passcode;
   during a telephone call initiated by the user to the toll-free number:
   receiving the passcode from the user and verifying, by the automated interactive voice response system, that it is valid;
   in response to the verification, retrieving the shopping cart of the user, and a name of the user and a billing address of the user previously entered at the merchant web site and further transmitting a passcode success message to a second web page;
   subsequent to transmitting the passcode success message to the second web page, playing back for the user over the telephone a summary message, wherein the summary messages includes a detailed summary of contents of the shopping cart, a total amount to be charged, a credit card number previously entered by the user through the telephone, the name of the user, and the billing address of the user;
   in response to playing back the summary message, receiving a purchase selection from the user over the telephone and transmitting a confirmation success message to the second web page;
   subsequent to transmitting the confirmation success message to the second web page, sending information on the user to a credit bureau or a third party system for an approval of the purchase; and
   in response to receiving the approval of the purchase from the credit bureau or the third party system, transmitting a confirmation number and a list of the plurality of items from the shopping cart to the user at a third web-page and the telephone.

* * * * *